US012753862B2

(12) United States Patent
Huang et al.

(10) Patent No.: US 12,753,862 B2
(45) Date of Patent: Oct. 6, 2026

(54) STAINLESS-STEEL BRAIDED PIPE ASSEMBLY

(71) Applicant: TAIZHOU KLOE DAFENG PLUMBING CO., LTD., Taizhou City (CN)

(72) Inventors: Weijie Huang, Taizhou City (CN); Youchun Huang, Taizhou City (CN)

(73) Assignee: TAIZHOU KLOE DAFENG PLUMBING CO., LTD., Taizhou City (CN)

( * ) Notice: Subject to any disclaimer, the term of this patent is extended or adjusted under 35 U.S.C. 154(b) by 87 days.

(21) Appl. No.: 19/005,448

(22) Filed: Dec. 30, 2024

(65) Prior Publication Data

US 2026/0117898 A1 Apr. 30, 2026

(30) Foreign Application Priority Data

Oct. 29, 2024 (CN) ......................... 202411516356.0

(51) Int. Cl.

| | |
|---|---|
| ***F16L 11/12*** | (2006.01) |
| ***F16L 11/10*** | (2006.01) |
| *F16L 11/118* | (2006.01) |
| *F16L 33/00* | (2006.01) |
| *F16L 33/01* | (2006.01) |
| *F16L 37/12* | (2006.01) |
| *F16L 37/23* | (2006.01) |
| *F16L 55/07* | (2006.01) |

(52) U.S. Cl.
CPC ............. *F16L 11/122* (2013.01); *F16L 11/10* (2013.01); *F16L 11/118* (2013.01); *F16L 33/006* (2013.01); *F16L 33/01* (2013.01); *F16L 37/12* (2013.01); *F16L 37/23* (2013.01); *F16L 55/07* (2013.01)

(58) Field of Classification Search
CPC ........ F16L 11/122; F16L 11/10; F16L 11/118; F16L 37/12; F16L 37/23; F16L 33/006; F16L 33/01; F16L 55/07
USPC .......................................................... 251/148
See application file for complete search history.

(56) References Cited

U.S. PATENT DOCUMENTS

| | | | | |
|---|---|---|---|---|
| 2,858,147 | A * | 10/1958 | Guarnaschelli | F16L 33/26 285/259 |
| 4,500,117 | A * | 2/1985 | Ayers | F16L 37/12 285/86 |
| 6,039,084 | A * | 3/2000 | Martucci | F16L 11/085 138/131 |
| 6,302,152 | B1 * | 10/2001 | Mulligan | F16L 11/10 138/109 |
| 6,672,628 | B2 * | 1/2004 | Thomas | F16L 37/0985 285/308 |
| 9,091,375 | B1 * | 7/2015 | DeBlasi | F16L 11/122 |
| 9,228,681 | B2 * | 1/2016 | Kluss | F16L 49/02 |
| 11,105,452 | B1 * | 8/2021 | Dias | F16L 37/091 |
| 12,338,928 | B2 * | 6/2025 | Ravisankar | F16L 37/0915 |
| 2007/0209728 | A1 * | 9/2007 | Mazzo | F16L 11/10 138/109 |
| 2017/0211726 | A1 * | 7/2017 | Yan | F16L 11/04 |

(Continued)

*Primary Examiner* — Minh Q Le

(57) ABSTRACT

A stainless-steel braided pipe assembly, including a valve, a braided pipe, and a quick-connect component. The quick-connect component includes an end connector, an end limit cap, an inner sleeve pipe, and a quick-connect retaining assembly, where a mounting gap for mounting a delivery pipe is defined between the inner sleeve pipe and the quick-connect retaining assembly.

10 Claims, 3 Drawing Sheets

(56) References Cited

U.S. PATENT DOCUMENTS

| | | | | |
|---|---|---|---|---|
| 2020/0200300 | A1* | 6/2020 | Zhang | F16L 11/04 |
| 2020/0263818 | A1* | 8/2020 | Prince | F16L 21/03 |
| 2021/0285584 | A1* | 9/2021 | Ravisankar | F16L 37/0915 |
| 2021/0324986 | A1* | 10/2021 | Simon | F16L 37/091 |
| 2021/0404584 | A1* | 12/2021 | Breeden, III | F16L 29/007 |
| 2023/0288001 | A1* | 9/2023 | Kluss | F16L 37/0915 |
| 2026/0117897 | A1* | 4/2026 | Huang | F16L 11/118 |

* cited by examiner

STAINLESS-STEEL BRAIDED PIPE ASSEMBLY

CROSS REFERENCE TO RELATED APPLICATIONS

The present application claims the priority of Chinese patent application No. 202411516356.0, filed on Oct. 29, 2024, and the entire contents of which are hereby incorporated by reference in its entirety.

TECHNICAL FIELD

The present disclosure relates to the technical field of braided pipes, and specifically to a stainless-steel braided pipe assembly.

BACKGROUND

A braided pipe is a connecting pipe fitting for low- and high-pressure water or gas supply. The braided pipe generally includes a flexible pipe, an outer stainless-steel wire braiding layer, and two hexagonal nut connections. In order to facilitate controlling the on and off of the supply of medium passing through the braided pipe, a valve is usually connected to an end of the braided pipe to form a braided pipe assembly. However, a conventional braided pipe assembly is usually connected to a pipe through a threaded connection, and this connection method not only fails to ensure the sealing performance of the connection between the braided pipe assembly and the pipe, but also makes it inconvenient to install and fix the braided pipe.

SUMMARY OF THE DISCLOSURE

The purpose of the present disclosure is to provide a braided pipe assembly with a simple structure, which is easy to install in pipes, has high installation strength and good sealing performance, in view of the above-mentioned existing technical problems.

In view of this, the present disclosure provides a stainless-steel braided pipe assembly, including:

a valve; where an end of the valve is arranged with a pipe joint, and another end of the valve is arranged with a threaded connection port;

a braided pipe, connected to the pipe joint of the valve; where the braided pipe includes a double-layer inner pipe made of PVC and an outer braided layer made of S304 stainless steel arranged outside the double-layer inner pipe; and a quick-connect component, connected to the threaded connection port of the valve;

where the quick-connect component includes:

an end connector, connected to the threaded connection port;

an end limit cap, arranged on an end of the end connector away from the threaded connection port;

an inner sleeve pipe, coaxially arranged in the end connector and extending to a port of the end limit cap; and a quick-connect retaining assembly, arranged in the end connector (3) and coaxially disposed outside the inner sleeve pipe; wherein the quick-connect retaining assembly is not disengaged from the end connector under restraint of the end limit cap;

where a mounting gap for mounting a delivery pipe is defined between the inner sleeve pipe and the quick-connect retaining assembly.

In some embodiments, a stepped hole is coaxially defined on the inner sleeve pipe, and the stepped hole includes an inner hole, a middle hole, and an outer hole successively connected in order from an end of the stepped hole close to the valve to another end of the stepped hole away from the valve, and a diameter of middle hole is less a diameter of the outer hole and greater than a diameter of the inner hole;

the quick-connect retaining assembly includes:

an inner positioning ring, abutting against an end surface of the outer hole and defining a tapered face hole;

an outer limit sleeve, sleeved outside the inner positioning ring and abutting against the end surface of the outer hole; and an outer sleeve pipe, disposed inside the outer limit sleeve and positionally limited by the outer limit sleeve.

In some embodiments, the inner sleeve pipe includes:

an inner pipe body; where an inner tapered guide portion is formed on an end of the inner pipe body away from the valve;

an inner pipe clip edge, integrally formed on another end of the inner pipe body close the valve; where an inner clip groove is defined on an inner wall of the inner hole of the end connector to limit fit with the inner pipe clip edge;

a plurality of extrusion inner cutting grooves, evenly distributed around a periphery of the inner sleeve pipe and extending from the end of the inner pipe body to the other end of the inner pipe body; and an outer sealing sleeve, sleeved on the end of the inner pipe body with the inner tapered guide portion; where an outer tapered guide portion that engages with the inner tapered guide portion is formed on an end of the outer sealing sleeve away from the valve.

In some embodiments, the inner sleeve pipe further includes:

an outer step, formed on the end of the inner pipe body with the inner tapered guide portion; wherein a wall surface, of the outer step, coaxially with the inner pipe body is conical in shape;

an inner step, formed on an inner wall of the outer sealing sleeve and cooperating with the outer step;

a plurality of sleeve sealing rings, arranged and slidable on step surfaces of the outer step in a one-to-one correspondence; and a plurality of sealing edges, distributed equidistantly on an outer wall of the outer sealing sleeve and protrusively arranged towards the mounting gap.

In some embodiments, the outer limit sleeve includes:

a limit cylinder, arranged on the outer hole and abutting against the end surface of the outer hole; and an inner limit hole, stepped and formed coaxially in the limit cylinder; where the inner limit hole includes a first step, a second step, and a third step successively connected to each other and decreasing in diameter from an end of the inner limit hole close to the valve to another end of the inner limit hole away from the valve;

where the inner positioning ring is disposed on an inner side of the first step; an end of the outer sleeve pipe is cooperatively fitted with an end surface of the second step, and the other end of the outer sleeve pipe extends out of the outer limit sleeve through the third step.

In some embodiments, the outer limit sleeve further includes:

an outer tapered mating portion, formed on an end of the limit cylinder away from the valve; where an inner wall of the end limit cap is formed with an inner tapered abutting portion capable of fitting against the outer tapered mating portion;

a plurality of limit holes, evenly distributed around a periphery of the outer tapered mating portion and extending inwardly from the outer tapered mating portion and communicating with the third step; and a plurality of limit pressing beads, arranged in the plurality of limit holes in a one-to-one correspondence; where each limit pressing bead is movable inwardly into the third step to squeeze the outer sleeve pipe during a process of the inner tapered abutting portion fitting against the outer tapered mating portion, and the diameter of the limit pressing bead is greater than the depth of the limit hole;

where the outer limit sleeve is prevented from disengaging from the end connector by an engagement of the inner tapered abutting portion with the outer tapered surface mating portion.

In some embodiments, the outer sleeve pipe includes:

an outer pipe body, with a ring-shaped outer wall;

an outer pipe clip edge, integrally formed on an end of the outer pipe body close to the valve and cooperatively fitted with the outer limit sleeve;

an extrusion hole, defined in the outer pipe body and having a tapered surface with an increasing diameter from an end of the extrusion hole close to the valve to another end of the extrusion hole away from the valve;

an outer pipe pressure edge, integrally formed in the extrusion hole; and a plurality of extrusion outer cutting grooves, evenly distributed around a periphery of the outer sleeve pipe and extending from the end of outer pipe body with the outer pipe clip edge to another end of outer pipe body, and cutting the outer pipe pressure edge.

In some embodiments, the quick-connect retaining assembly further includes:

an outer retaining ring, arranged in the outer limit sleeve; where the outer retaining ring includes:

an outer ring body, abutting between an end surface of the first step and the inner positioning ring; and a plurality of retaining tabs, uniformly distributed around a periphery of the outer retaining ring and integrally formed on an inner side of the outer ring body, and arranged obliquely towards the inner positioning ring.

In some embodiments, the quick-connect retaining assembly further includes:

an inner seal reinforcement, arranged on a connection between the middle hole and the outer hole;

where the inner seal reinforcement includes:

a seal body, with curved inner and outer walls; wherein a seal groove is defined on the connection between the middle hole and the outer hole for accommodating the seal body; and two sealing rings, symmetrically arranged on an inner wall of the seal body.

In some embodiments, the inner seal reinforcement further includes:

two side pressure members, disposed on both ends of the seal body;

a side pressure block, trapezoidal in shape and formed on an end of each side pressure member that abuts against the seal body; where a pressing groove that is interference-fitted with the side pressure block is defined on an end surface of the seal body; and an inner pre-tensioning spring, arranged on an end surface on a side of the seal groove close to the middle hole; where an inner recess is defined on the seal groove for accommodating the inner pre-tensioning spring;

where one of the two side pressure members abuts against the inner pre-tensioning spring, and the other of the two side pressure members abuts against the inner positioning ring.

The beneficial effects of the present disclosure are:

1. The braided pipe assembly can improve the convenience and tightness of the connection between the assembly and the delivery pipe through the setting of quick-connect component;
2. The quick-connect component can ensure the tightness of the connection with the inner wall of the delivery pipe through the setting of an inner sleeve;
3. The quick-connect component can improve the connection strength and sealing effect on the outer wall of the delivery pipe through the cooperation of an outer sleeve pipe and an inner sealing reinforcement.

REFERENCE NUMERALS

Figure 1:
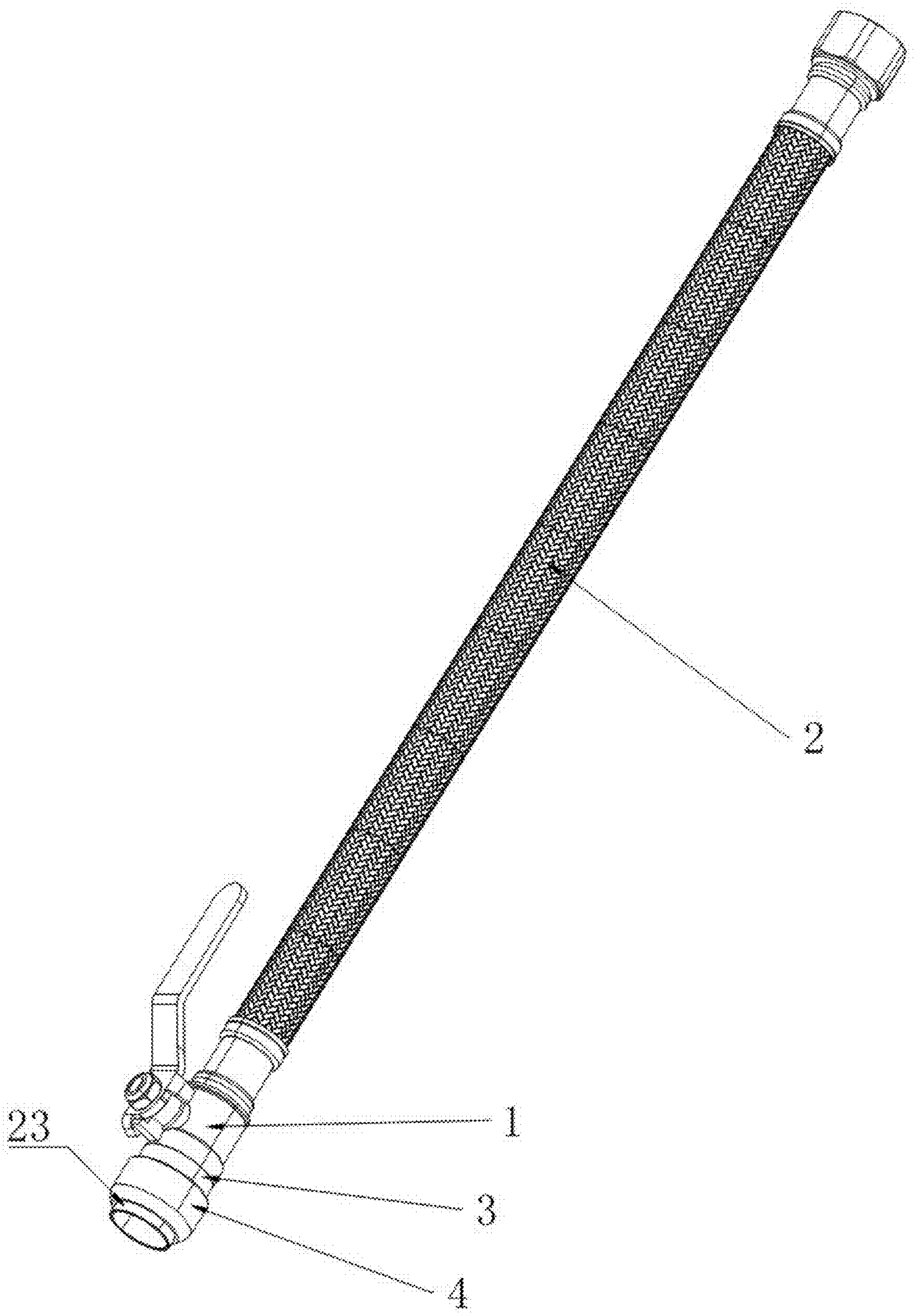
FIG. 1 is a perspective structural schematic view according to some embodiments of the present disclosure.
Figure 2:
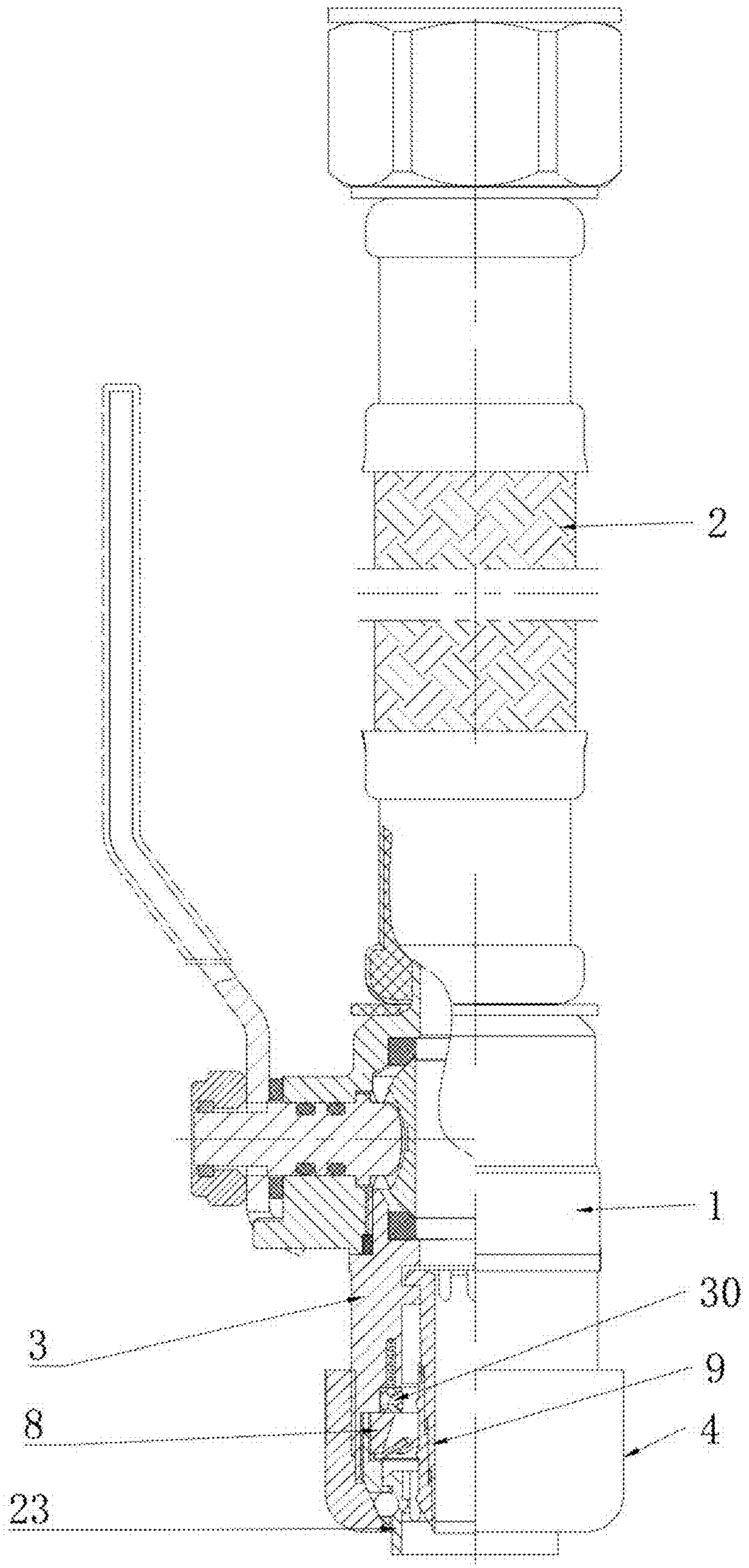
FIG. 2 is a cross-sectional schematic view according to some embodiments of the present disclosure.
Figure 3:
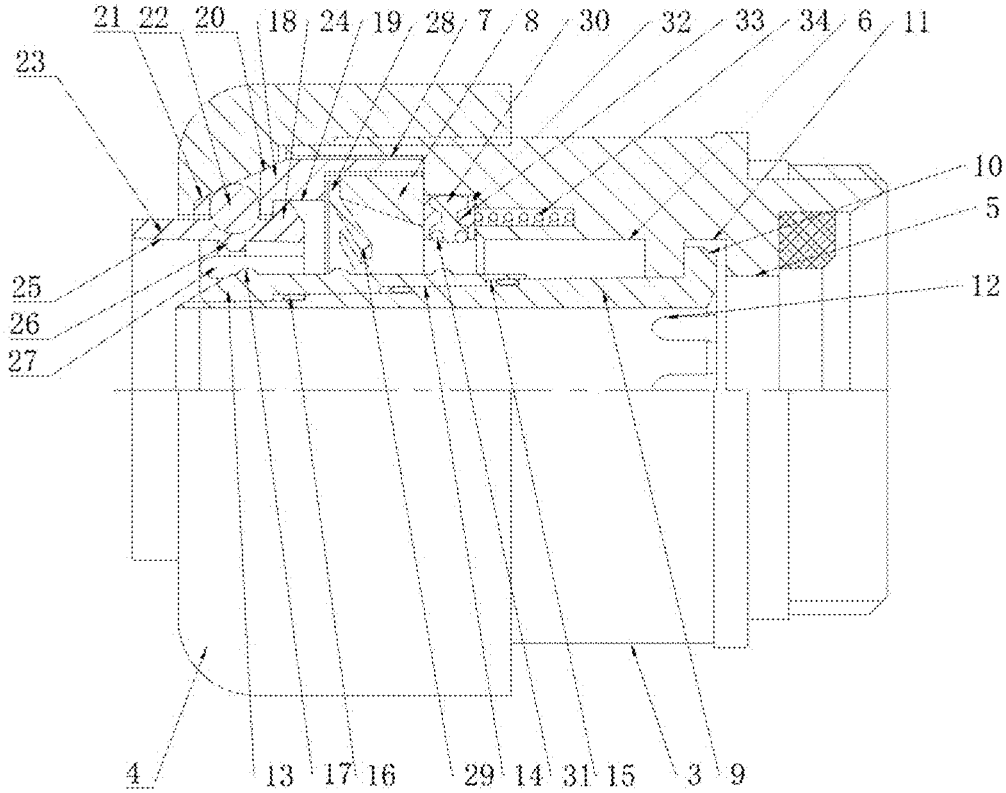
FIG. 3 is a structural schematic view of a quick-connect component according to some embodiments of the present disclosure.

1—valve, 2—braided pipe, 3—end connector, 4—end limit cap, 5—inner hole, 6—middle hole, 7—outer hole, 8—inner positioning ring, 9—inner pipe body, 10—inner pipe clip edge, 11—inner clip groove, 12—extrusion inner cutting groove, 13—outer sealing sleeve, 14—outer step, 15—inner step, 16—sleeve sealing ring, 17—sealing edge, 18—limit cylinder, 19—inner limit hole, 20—outer tapered mating portion, 21—inner tapered abutting portion, 22—limit pressing bead, 23—outer pipe body, 24—outer pipe clip edge, 25—extrusion hole, 26—outer pipe pressure edge, 27—extrusion outer cutting groove, 28—outer ring body, 29—retaining tab, 30—seal body, 31—sealing ring, 32—side pressure member, 33—side pressure block, 34—inner pre-tensioned spring.

DETAILED DESCRIPTION

The technical solution of the embodiments of the present disclosure will be described in a clear manner below in conjunction with the drawings in the embodiments of the present disclosure. Obviously, the embodiments described are some embodiments but not all of the embodiments of the present disclosure. All other embodiments obtained by those skilled in the art based on the embodiments of the present disclosure fall within the scope of the present disclosure.

Embodiment 1

The present embodiment provides a stainless-steel braided pipe assembly, including:

a valve 1; where an end of the valve 1 is arranged with a pipe joint, and another end of the valve 1 is arranged with a threaded connection port;

a braided pipe 2, connected to the pipe joint of the valve 1; where the braided pipe 2 includes a double-layer inner pipe made of PVC and an outer braided layer made of S304 stainless steel arranged outside the double-layer inner pipe; and a quick-connect component, connected to the threaded connection port of the valve 1;

where the quick-connect component includes:

an end connector 3, connected to the threaded connection port;

an end limit cap 4, arranged on an end of the end connector 3 away from the threaded connection port;

an inner sleeve pipe, coaxially arranged in the end connector 3 and extending to a port of the end limit cap 4; and a quick-connect retaining assembly, arranged in the end connector 3 and coaxially disposed outside the inner sleeve pipe; where the quick-connect retaining assembly is not disengaged from the end connector 3 under restraint of the end limit cap 4;

where a mounting gap for mounting a delivery pipe is defined between the inner sleeve pipe and the quick-connect retaining assembly.

In the present embodiment, the valve 1 may be a conventional valve such as a ball valve or a globe valve used in water supply or gas supply pipelines; the valve 1 is fixedly connected to the double-layer inner pipe of the braided pipe 2 through the pipe joint. The quick-connect component is arranged to facilitate connection of an end of the braided pipe assembly to the delivery pipe, and in order to ensure the convenience of connection of both ends of the braided pipe assembly, another quick-connect component may be arranged on the other end of the braided pipe 2 away from the valve 1.

The end connector 3 of the quick-connect component may facilitate connection to the valve 1 or the braided pipe 2. During mounting, the delivery pipe is inserted into the mounting gap, such that the inner sleeve pipe is inserted into the delivery pipe, and the quick-connect retaining assembly is disposed outside the delivery pipe, and then the end limit cap 4 is tightened to complete the connection between the braided pipe assembly and the delivery pipe. Since the inner sleeve pipe is inside the delivery pipe, the sealing effect of the connection with the delivery pipe is improved, and thus there is no need to wrap sealing tape around the delivery pipe, thereby ensuring the ease of mounting and sealing performance of the braided pipe assembly.

Embodiment 2

The present embodiment provides a stainless-steel braided pipe assembly, which, in addition to including the technical solution of the above embodiment, further has the following technical features.

A stepped hole is coaxially defined on the inner sleeve pipe, and the stepped hole includes an inner hole 5, a middle hole 6, and an outer hole 7 successively connected in order from an end of the stepped hole close to the valve 1 to the other end of the stepped hole away from the valve 1, and the diameter of middle hole 6 is less the diameter of the outer hole 7 and greater than the diameter of the inner hole 5;

where the quick-connect retaining assembly includes:

an inner positioning ring 8, abutting against an end surface of the outer hole 7 and defining a tapered face hole;

an outer limit sleeve, sleeved outside the inner positioning ring 8 and abutting against the end surface of the outer hole 7, and an outer sleeve pipe, disposed inside the outer limit sleeve and positionally limited by the outer limit sleeve.

In the present embodiment, the inner hole 5 is configured to be in communication with the valve 1 and to accommodate the inner sleeve pipe, while the middle hole 6 and outer hole 7 are configured to accommodate the quick-connect retaining assembly. The inner positioning ring 8 of the quick-connect retaining assembly may be made of a material such as PVC, and the tapered face hole on the inner positioning ring 8 increases in diameter from the end of the stepped hole close to the valve 1 to the other end of the stepped hole away from the valve 1; the inner positioning ring 8 is configured to provide good positioning and support at the bottom of the outer limit sleeve. The outer limit sleeve is arranged to facilitate the limit fit of the quick-connect retaining assembly with the end limit cap 4, thereby preventing the quick-connect retaining assembly from disengaging from the end connector 3. The outer limit sleeve is configured to cooperate with an outer wall of the delivery pipe, for supporting and limiting the outer wall of the delivery pipe, thereby preventing the delivery pipe from disengaging.

Embodiment 3

The present embodiment provides a stainless-steel braided pipe assembly, which, in addition to including the technical solution of the above embodiments, further has the following technical features.

The inner sleeve pipe includes:

an inner pipe body 9; where an inner tapered guide portion is formed on an end of the inner pipe body 9 away from the valve 1;

an inner pipe clip edge 10, integrally formed on the other end of the inner pipe body 9 close the valve 1; where an inner clip groove 11 is defined on an inner wall of the inner hole 5 of the end connector 3 to limit fit with the inner pipe clip edge 10;

multiple extrusion inner cutting grooves 12, evenly distributed around a periphery of the inner sleeve pipe and extending from the end of the inner pipe body 9 to the other end of the inner pipe body 9; and an outer sealing sleeve 13, sleeved on the end of the inner pipe body 9 with the inner tapered guide portion; where an outer tapered guide portion that engages with the inner tapered guide portion is formed on an end of the outer sealing sleeve 13 away from the valve 1.

In the present embodiment, the inner sleeve pipe may be made of a material such as PC or stainless-steel; the inner tapered guide portion on the inner pipe body 9 and the outer tapered surface guide may provide good guidance for the delivery pipe when the delivery pipe is inserted into the mounting gap, thereby facilitating the insertion of the delivery pipe outside the inner pipe body 9; the inner pipe clip edge 10 is configured for fixation in a limited manner with the end connector 3 to prevent the inner sleeve pipe from disengaging from the end connector 3.

The extrusion inner cutting groove 12 is arranged to provide a certain deformation clearance for the inner pipe body 9 at the position of the inner pipe clip edge 10 during the insertion of the inner pipe clip edge 10 into the inner clip groove 11, which not only facilitates the fixation of the inner pipe clip edge 10, but also reduces the probability of damage to the inner sleeve pipe. Since the extrusion inner cutting groove 12 and the inner pipe clip edge 10 are both inside the end connector 3 after the delivery pipe is mounted, the delivery pipe may be prevented from disengaging and falling off. In addition, the outer sealing sleeve 13 is arranged to improve the sealing effect of the connection between the inner sleeve pipe and the inner wall of the delivery pipe.

In addition, in order to ensure the primary sealing of the connection between the inner sleeve pipe and the delivery pipe, the depth of the extrusion inner cutting groove 12 is less than or equal to the height of an end surface of the middle hole 6 in the inner clip groove 11. In order to facilitate the fixing of the inner pipe clip edge 10, a guide chamfer may be arranged on an outer edge on an end of the inner pipe clip edge 10 away from the inner pipe body 9.

Embodiment 4

The present embodiment provides a stainless-steel braided pipe assembly, which, in addition to including the technical solution of the above embodiments, further has the following technical features.

The inner sleeve pipe further includes:

an outer step 14, formed on the end of the inner pipe body 9 with the inner tapered guide portion; where a wall surface, of the outer step 14, coaxially with the inner pipe body 9 is conical in shape;

an inner step 15, formed on an inner wall of the outer sealing sleeve 13 and cooperating with the outer step 14;

multiple sleeve sealing rings 16, which are arranged and slidable on step surfaces of the outer step 14 in a one-to-one correspondence; and multiple sealing edges 17, distributed equidistantly on an outer wall of the outer sealing sleeve 13 and protrusively arranged towards the mounting gap.

In the present embodiment, the inner step 15 is slidable axially on the outer step 14 in a certain range towards the valve 1, and the closer the inner step 15 moves towards the valve 1, the tighter the outer sealing sleeve 13 is connected to the inner pipe body 9. The fit between the outer sealing sleeve 13 and the inner pipe body 9 becomes tighter and the sealing performance is better when the inner wall of the delivery pipe comes into contact with the outer sealing sleeve 13 through the cooperation of the inner step 15 and the outer step 14 and continues to move towards the mounting gap, thereby ensuring the sealing effect of the contact between the outer sealing sleeve 13 and the inner pipe body 9.

The sleeve sealing ring 16 is arranged to further improve the sealing effect of the connection between the outer sealing sleeve 13 and the inner pipe body 9; and the sealing edge 17 is arranged to improve the sealing performance of the outer sealing sleeve 13 and the interior of the delivery pipe.

Embodiment 5

The present embodiment provides a stainless-steel braided pipe assembly, which, in addition to including the technical solution of the above embodiments, further has the following technical features.

The outer limit sleeve includes:

a limit cylinder 18, arranged on the outer hole 7 and abutting against the end surface of the outer hole 7; and an inner limit hole 19, stepped and formed coaxially in the limit cylinder 18; where the inner limit hole 19 includes a first step, a second step, and a third step successively connected to each other and decreasing in diameter from an end of the inner limit hole 19 close to the valve 1 to the other end of the inner limit hole 19 away from the valve 1;

where the inner positioning ring 8 is disposed on an inner side of the first step; an end of the outer sleeve pipe is cooperatively fitted with an end surface of the second step, and the other end of the outer sleeve pipe extends out of the outer limit sleeve through the third step.

In the present embodiment, the limit cylinder provides support and positioning in the quick-connect retaining assembly to ensure the overall stability of the quick-connect retaining assembly during mounting. The inner limit hole 19 is arranged to hold the inner positioning ring 8 and also to position the outer sleeve pipe, thereby preventing the outer sleeve pipe from detaching from the inner positioning ring 8 and ensuring the overall structural strength of the quick-connect retaining assembly.

Embodiment 6

The present embodiment provides a stainless-steel braided pipe assembly, which, in addition to including the technical solution of the above embodiments, further has the following technical features.

The outer limit sleeve further includes:

an outer tapered mating portion 20, formed on an end of the limit cylinder 18 away from the valve 1; where an inner wall of the end limit cap 4 is formed with an inner tapered abutting portion 21 capable of fitting against the outer tapered mating portion 20;

multiple limit holes, evenly distributed around a periphery of the outer tapered mating portion 20 and extending inwardly from the outer tapered mating portion 20 and communicating with the third step;

multiple limit pressing beads 22, arranged in the multiple limit holes in a one-to-one correspondence; where each limit pressing bead 22 is movable inwardly into the third step to squeeze the outer sleeve pipe during a process of the inner tapered abutting portion 21 fitting against the outer tapered mating portion 20, and the diameter of the limit pressing bead 22 is greater than the depth of the limit hole;

where the outer limit sleeve is prevented from disengaging from the end connector 3 by an engagement of the inner tapered abutting portion 21 with the outer tapered surface mating portion 20.

In the present embodiment, the outer limit sleeve may be made of PC material, and the end limit cap 4 and limit pressing bead 22 may be made of stainless-steel material.

The outer tapered mating portion 20 is arranged to engage with the inner tapered abutting portion 21 in the end limit cap 4. During screwing of the end limit cap 4, the gap between the outer tapered mating portion 20 and the inner tapered abutting portion 21 gradually becomes smaller until they fit together. During this process, the inner tapered abutting portion 21 continually squeezes the limit pressing bead 22, causing the limit pressing bead 22 to move towards the other side of the limit hole, i.e., the third step, thereby continually squeezing a part of the inner sleeve pipe disposed in the third step, and thus improving the connection and strength of the outer sleeve pipe with the outer wall of the delivery pipe, so as to better prevent the delivery pipe from detaching.

Embodiment 7

The present embodiment provides a stainless-steel braided pipe assembly, which, in addition to including the technical solution of the above embodiments, further has the following technical features.

The outer sleeve pipe includes:

an outer pipe body 23, with a ring-shaped outer wall;

an outer pipe clip edge 24, integrally formed on an end of the outer pipe body 23 close to the valve 1 and cooperatively fitted with the outer limit sleeve;

an extrusion hole 25, defined in the outer pipe body 23 and having a tapered surface with an increasing diameter from an end close to the valve 1 to the other end;

an outer pipe pressure edge 26, integrally formed in the extrusion hole 25; and multiple extrusion outer cutting grooves 27, evenly distributed around a periphery of the outer sleeve pipe and extending from the end of outer pipe body 23 with the outer pipe clip edge 24 to the other end of outer pipe body 23, and cutting the outer pipe pressure edge 26.

In the present embodiment, the outer pipe clip edge 24 is clamped to an end surface of the second step of the outer limit sleeve, thereby facilitating the connection between the outer sleeve pipe and the outer limit sleeve and preventing the outer sleeve pipe from disengaging; and the extrusion hole 25 is arranged to ensure the fit and strength between the outer sleeve pipe and the delivery pipe during the process of inserting and mounting the delivery pipe.

The limit pressing bead 22 presses against an outer wall of the outer pipe body 23 with the outer pipe pressing edge 26 during the process of the inner tapered abutting portion 21 fitting with the outer tapered surface mating part 20; the limit pressing bead 22 presses against the outer pipe body 23, causing the outer pipe pressing edge 26 inside the outer pipe body 23 to firmly catch on the outer wall of the delivery pipe, thereby ensuring the stability and strength of the connection between the braided pipe assembly and the delivery pipe. Moreover, the outer pipe pressure edge 26 is disposed outside one of the sealing edges 17 of the inner sleeve pipe. While the outer pipe pressure edge 26 presses against the outer wall of the delivery pipe, it may further cause the inner wall of the delivery pipe to firmly fit against the sealing edge 17 in its position, thereby further ensuring the sealing effect of the connection of the delivery pipe.

The extrusion outer cutting groove 27 can provide a certain narrowing gap for the outer pipe body 23 during the process of the limit pressing bead 22 pressing against the outer pipe body 23, and can further provide a certain extrusion and contraction gap for the outer sleeve pipe when the outer pipe body 23 extrudes the outer sleeve clip edge 24 during the process of the outer pipe body 23 being inserted from outside the outer limit sleeve into the outer limit sleeve, thereby facilitating the outer sleeve pipe to be mounted from the outside into the outer limit sleeve.

In addition, the number of the limit holes shall be at least twice the number of the extrusion outer cutting grooves 27. The width of the extrusion outer cutting groove 27 is less than the diameter of the limit pressing bead 22, and each limit hole is provided with a corresponding limit pressing bead 22, thereby ensuring that when the outer sleeve pipe is rotated to any angle, some of the limit pressing beads 22 will not all rest on the extrusion outer cutting groove 27 of the outer pipe body 23, so as to ensure the strength and stability of the limit pressing beads 22 pressing against the outer sleeve pipe.

Embodiment 8

The present embodiment provides a stainless-steel braided pipe assembly, which, in addition to including the technical solution of the above embodiments, further has the following technical features.

The quick-connect retaining assembly further includes:

an outer retaining ring, arranged in the outer limit sleeve; where the outer retaining ring includes:

an outer ring body 28, abutting between the end surface of the first step and the inner positioning ring 8; and multiple retaining tabs 29, uniformly distributed around a periphery of the outer retaining ring and integrally formed on an inner side of the outer ring body 28, and arranged obliquely towards the inner positioning ring 8.

In the present embodiment, the outer retaining ring is integrally made of a resilient metal; the outer retaining ring is supported by the outer ring body 28 such that it does not disengage off the quick-connect retaining assembly; and the retaining tab 29 is inclined towards the inner positioning ring 8, making it easier to insert the delivery pipe into the mounting gap. After the delivery pipe is inserted into the mounting gap, the retaining spring 29 will firmly press against the outer wall of the delivery pipe due to its elasticity and squeeze it, and more firmly press against the outer wall of the delivery pipe when the delivery pipe is disengaged in a direction away from the positioning ring, thereby preventing the delivery pipe from disengaging. In addition, the outer retaining ring is disposed outside one of the sealing edges 17 of the inner sleeve pipe, such that when the retaining tab 29 presses against the outer wall of the delivery pipe, it causes the inner wall of the delivery pipe in the position to firmly fit against the sealing edge 17, thereby improving the sealing effect of connection with the delivery pipe.

Embodiment 9

The present embodiment provides a stainless-steel braided pipe assembly, which, in addition to including the technical solution of the above embodiments, further has the following technical features.

The quick-connect retaining assembly further includes:

an inner seal reinforcement, arranged on a connection between the middle hole 6 and the outer hole 7;

the inner seal reinforcement includes:

a seal body 30, with curved inner and outer walls; where a seal groove is defined on the connection between the middle hole 6 and the outer hole 7 for accommodating the seal body 30; and two sealing rings 31, symmetrically arranged on an inner wall of the seal body 30.

In the present embodiment, the arrangement of the inner sealing reinforcement can improve the sealing performance of the quick-connect retaining assembly when connected to the outer wall of the delivery pipe, thereby further ensuring the sealing performance of the braided pipe assembly during mounting. The sealing ring 31 and the seal body 30 may both be made of heat-resistant and ageing-resistant synthetic rubber; the inner and outer walls of the seal body 30 are curved, and the curved surface contact can improve the sealing between the inner seal reinforcement and the end connector 3 and the delivery pipe; and by arranging two sealing rings 31 on the inner wall of the seal body 30, the sealing effect between the inner seal reinforcement and the delivery pipe can be further improved.

Embodiment 10

The present embodiment provides a stainless-steel braided pipe assembly, which, in addition to including the technical solution of the above embodiments, further has the following technical features.

The inner seal reinforcement further includes:

two side pressure members 32, disposed on both ends of the seal body 30;

a side pressure block 33, which is trapezoidal in shape and formed on an end of the side pressure member 32 that abuts against the seal body 30; where a pressing groove that is interference-fitted with the side pressure block 33 is defined on an end surface of the seal body 30; and an inner pre-tensioning spring 34, arranged on an end surface on a side of the seal groove close to the middle hole 6; where an inner recess is defined on the seal groove for accommodating the inner pre-tensioning spring;

where one of the two side pressure members 32 abuts against the inner pre-tensioning spring 34, and the other of the two side pressure members abuts against the inner positioning ring 8.

In the present embodiment, the side pressure block 33 is integrally formed on the side pressure member 32, and the side pressure member 32 may be made of materials such as stainless-steel or PC; thus, during the process of tightening the end limit cap 4, the outer limit sleeve is driven to cause the inner positioning ring 8 to press against the side pressure member 32 at one end, while the side pressure member 32 at the other end is supported by the inner pre-tensioning spring 34, such that the side pressure blocks 33 on both sides of the seal body 30 are in a balanced position, that is, the side pressure blocks 33 on the side pressure members 32 on both ends are pressed into the pressing grooves on the same side to the same extent. in this way, the degree of extrusion and deformation on both sides of the seal body 30 is the same. The radial extrusion of the seal body 30 caused by the side pressure blocks 33 pressing into the pressing grooves causes the inner and outer sides of the seal body 30 to better adhere to the end connector 3 and the delivery pipe, respectively. In addition, the extrusion of the seal body 30 can further improve the sealing effect of the contact between the sealing ring 31 and the delivery pipe. Furthermore, the seal body 30 is disposed outside one of the sealing edges 17 of the inner sleeve pipe, such that the inner wall of the delivery pipe is also firmly pressed against the sealing edge 17 when the seal body 30 exerts pressure on the outer wall of the conveying pipe.

The above is description of some embodiments of the present disclosure in conjunction with the accompanying drawings, and the embodiments and features thereof may be combined with each other to the extent that they do not conflict. The present disclosure is not limited to the above specific embodiments, which are merely illustrative and not restrictive. Those skilled in the art, under the inspiration of the present disclosure and without departing from the scope protected by the purpose and claims of the present disclosure, can make many other forms, all of which fall within the scope of the present disclosure.

What is claimed is:

1. A stainless-steel braided pipe assembly, comprising:

a valve (1); wherein an end of the valve (1) is arranged with a pipe joint, and another end of the valve (1) is arranged with a threaded connection port;

a braided pipe (2), connected to the pipe joint of the valve (1); and a quick-connect component, connected to the threaded connection port of the valve (1);

wherein the quick-connect component comprises:

an end connector (3), connected to the threaded connection port;

an end limit cap (4), arranged on an end of the end connector (3) away from the threaded connection port;

an inner sleeve pipe, coaxially arranged in the end connector (3) and extending to a port of the end limit cap (4); and a quick-connect retaining assembly, arranged in the end connector (3) and coaxially disposed outside the inner sleeve pipe; wherein the quick-connect retaining assembly is not disengaged from the end connector (3) under restraint of the end limit cap (4);

wherein a mounting gap for mounting a delivery pipe is defined between the inner sleeve pipe and the quick-connect retaining assembly.

2. The stainless-steel braided pipe assembly according to claim 1, wherein a stepped hole is coaxially defined on the inner sleeve pipe, and the stepped hole comprises an inner hole (5), a middle hole (6), and an outer hole (7) successively connected in order from an end of the stepped hole close to the valve (1) to another end of the stepped hole away from the valve (1), and a diameter of middle hole (6) is less a diameter of the outer hole (7) and greater than a diameter of the inner hole (5);

wherein the quick-connect retaining assembly comprises:

an inner positioning ring (8), abutting against an end surface of the outer hole (7) and defining a tapered face hole;

an outer limit sleeve, sleeved outside the inner positioning ring (8) and abutting against the end surface of the outer hole (7); and an outer sleeve pipe, disposed inside the outer limit sleeve and positionally limited by the outer limit sleeve.

3. The stainless-steel braided pipe assembly according to claim 1, wherein the inner sleeve pipe comprises:

an inner pipe body (9); where an inner tapered guide portion is formed on an end of the inner pipe body (9) away from the valve (1);

an inner pipe clip edge (10), integrally formed on another end of the inner pipe body (9) close the valve (1); wherein an inner clip groove (11) is defined on an inner wall of the inner hole (5) of the end connector (3) to limit fit with the inner pipe clip edge (10);

a plurality of extrusion inner cutting grooves (12), evenly distributed around a periphery of the inner sleeve pipe and extending from the end of the inner pipe body (9) to the other end of the inner pipe body (9); and an outer sealing sleeve (13), sleeved on the end of the inner pipe body (9) with the inner tapered guide portion; wherein an outer tapered guide portion that engages with the inner tapered guide portion is formed on an end of the outer sealing sleeve (13) away from the valve (1).

4. The stainless-steel braided pipe assembly according to claim 3, wherein the inner sleeve pipe further comprises:

an outer step (14), formed on the end of the inner pipe body (9) with the inner tapered guide portion; wherein a wall surface, of the outer step (14), coaxially with the inner pipe body (9) is conical in shape;

an inner step (15), formed on an inner wall of the outer sealing sleeve (13) and cooperating with the outer step (14);

a plurality of sleeve sealing rings (16), arranged and slidable on step surfaces of the outer step (14) in a one-to-one correspondence; and a plurality of sealing edges (17), distributed equidistantly on an outer wall of the outer sealing sleeve (13) and protrusively arranged towards the mounting gap.

5. The stainless-steel braided pipe assembly according to claim 2, wherein the outer limit sleeve comprises:

a limit cylinder (18), arranged on the outer hole (7) and abutting against the end surface of the outer hole (7); and an inner limit hole (19), stepped and formed coaxially in the limit cylinder (18); wherein the inner limit hole (19) comprises a first step, a second step, and a third step successively connected to each other and decreasing in diameter from an end of the inner limit hole (19) close to the valve (1) to another end of the inner limit hole (19) away from the valve (1).

6. The stainless-steel braided pipe assembly according to claim 5, wherein the outer limit sleeve further comprises:

an outer tapered mating portion (20), formed on an end of the limit cylinder (18) away from the valve (1); wherein an inner wall of the end limit cap (4) is formed with an inner tapered abutting portion (21) capable of fitting against the outer tapered mating portion (20);

a plurality of limit holes, evenly distributed around a periphery of the outer tapered mating portion (20) and extending inwardly from the outer tapered mating portion (20) and communicating with the third step; and a plurality of limit pressing beads (22), arranged in the plurality of limit holes in a one-to-one correspondence.

7. The stainless-steel braided pipe assembly according to claim 2, wherein the outer sleeve pipe comprises:

an outer pipe body (23), with a ring-shaped outer wall;

an outer pipe clip edge (24), integrally formed on an end of the outer pipe body (23) close to the valve (1) and cooperatively fitted with the outer limit sleeve;

an extrusion hole (25), defined in the outer pipe body (23) and having a tapered surface with an increasing diameter from an end of the extrusion hole (25) close to the valve (1) to another end of the extrusion hole (25) away from the valve (1);

an outer pipe pressure edge (26), integrally formed in the extrusion hole (25); and a plurality of extrusion outer cutting grooves (27), evenly distributed around a periphery of the outer sleeve pipe and extending from the end of outer pipe body (23) with the outer pipe clip edge (24) to another end of outer pipe body (23), and cutting the outer pipe pressure edge (26).

8. The stainless-steel braided pipe assembly according to claim 5, wherein the quick-connect retaining assembly further comprises:

an outer retaining ring, arranged in the outer limit sleeve;

wherein the outer retaining ring comprises:

an outer ring body (28), abutting between an end surface of the first step and the inner positioning ring (8); and a plurality of retaining tabs (29), uniformly distributed around a periphery of the outer retaining ring and integrally formed on an inner side of the outer ring body (28), and arranged obliquely towards the inner positioning ring (8).

9. The stainless-steel braided pipe assembly according to claim 2, wherein the quick-connect retaining assembly further comprises:

an inner seal reinforcement, arranged on a connection between the middle hole (6) and the outer hole (7);

wherein the inner seal reinforcement comprises:

a seal body (30), with curved inner and outer walls; wherein a seal groove is defined on the connection between the middle hole (6) and the outer hole (7) for accommodating the seal body (30); and two sealing rings (31), symmetrically arranged on an inner wall of the seal body (30).

10. The stainless-steel braided pipe assembly according to claim 9, wherein the inner seal reinforcement further comprises:

two side pressure members (32), disposed on both ends of the seal body (30);

a side pressure block (33), trapezoidal in shape and formed on an end of each side pressure member (32) that abuts against the seal body (30); wherein a pressing groove that is interference-fitted with the side pressure block (33) is defined on an end surface of the seal body (30); and an inner pre-tensioning spring (34), arranged on an end surface on a side of the seal groove close to the middle hole (6); wherein an inner recess is defined on the seal groove for accommodating the inner pre-tensioning spring (34).

* * * * *